United States Patent [19]
Frey

[11] Patent Number: 5,367,116
[45] Date of Patent: Nov. 22, 1994

[54] PROCESS FOR THE DISPOSAL OF FLUE GAS RESIDUES

[75] Inventor: Rudolf Frey, Effretikon, Switzerland

[73] Assignee: Von Roll AG, Gerlafingen, Switzerland

[21] Appl. No.: 70,205

[22] Filed: Jun. 2, 1993

[30] Foreign Application Priority Data

Jun. 5, 1992 [CH] Switzerland ............. 01 817/92-9

[51] Int. Cl.$^5$ ................. B09B 1/00; B28B 3/00; E04B 1/16
[52] U.S. Cl. ................. 588/252; 264/31; 264/86; 264/333; 264/DIG. 69; 405/128; 588/249
[58] Field of Search ........... 264/31, 333, 86, 256, 264/DIG. 49, DIG. 69; 405/128, 129, 266–268; 588/252, 249

[56] References Cited

U.S. PATENT DOCUMENTS

| | | |
|---|---|---|
| 4,250,134 | 2/1981 | Minnick ............. 264/333 X |
| 4,354,942 | 10/1982 | Kaczur et al. . |
| 4,370,233 | 1/1983 | Hayes et al. . |
| 4,397,742 | 8/1983 | Minnick ............. 264/DIG. 49 X |
| 4,397,801 | 8/1983 | Minnick ............. 264/333 X |
| 4,617,180 | 10/1986 | Vogg . |
| 4,804,147 | 2/1989 | Hooper . |
| 4,859,440 | 8/1989 | Zechner et al. . |
| 4,911,757 | 3/1990 | Lynn et al. . |
| 5,037,286 | 8/1991 | Roberts ............. 264/333 X |
| 5,045,115 | 9/1991 | Gmunder et al. . |
| 5,245,114 | 9/1993 | Forrester . |

FOREIGN PATENT DOCUMENTS

2512440 3/1983 France ............. 264/DIG. 49
8912609 12/1989 WIPO .

*Primary Examiner*—Karen Aftergut
*Attorney, Agent, or Firm*—Oblon, Spivak, McClelland, Maier & Neustadt

[57] ABSTRACT

Solid residues obtained in flue gas purification, in particular flue dusts, are disposed in an environmentally compatible and economical manner by acid extracting heavy metals from the residues, precipitating the heavy metals from the extract, separating the precipitate from the mother liquor, subjecting the precipitate containing heavy metals to mechanical stress during which procedure the water contained in the precipitate is released and the precipitate itself is resuspended, and then adding a hydraulic binder to the resuspended precipitate containing heavy metals and/or to the extracted residues separately from one another. The binder-containing mixture can be used to form moldings which, after hardening, are employed for the erection of boundary walls in a landfill, Additionally or alternatively, the plastic binder-containing mixture can be introduced in the form of layers into preformed landfill spaces, where it then hardens.

10 Claims, 1 Drawing Sheet

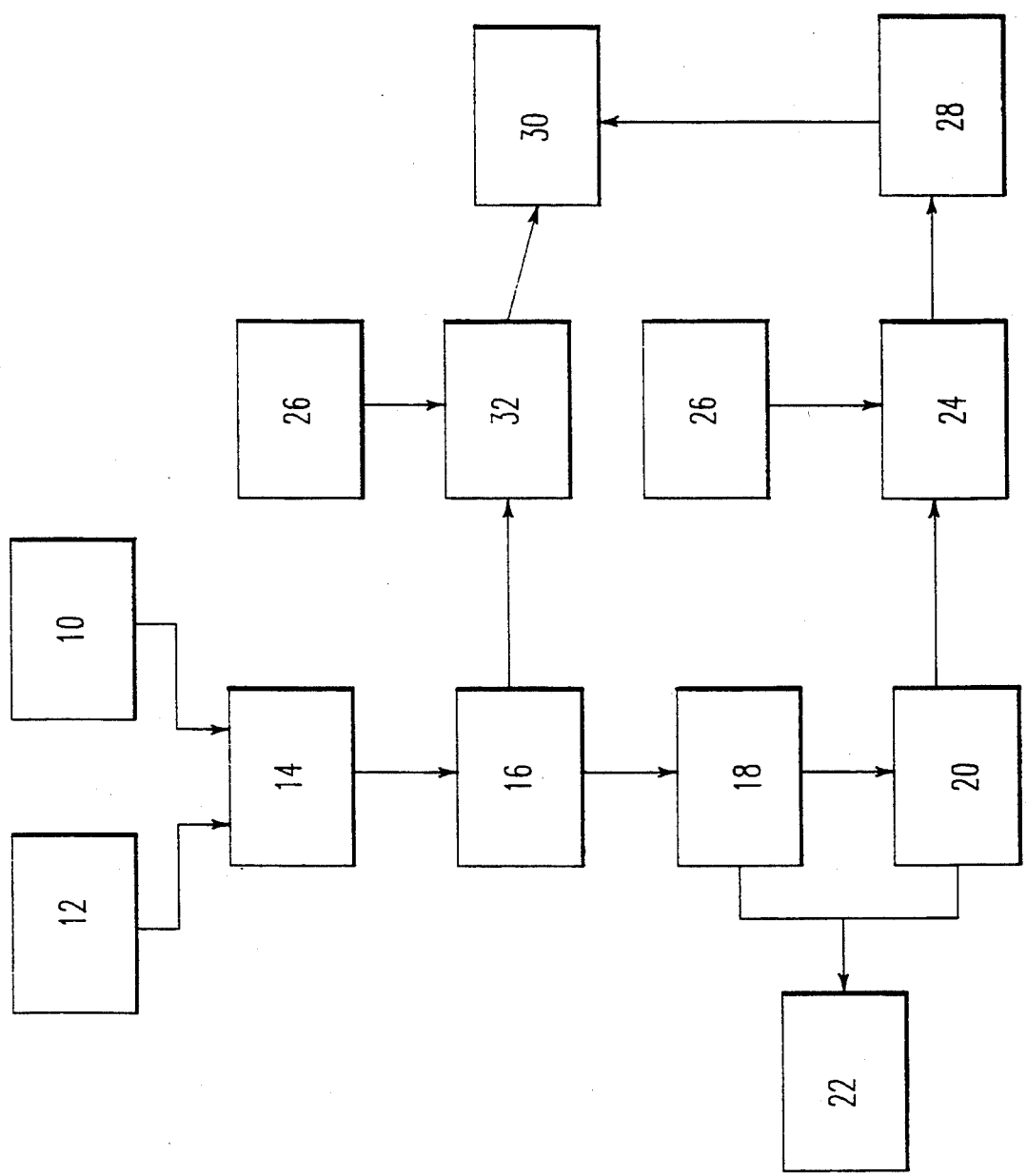

PROCESS FOR THE DISPOSAL OF FLUE GAS RESIDUES

BACKGROUND OF THE INVENTION

1. Field of the Invention

The present invention relates to residues which are obtained in the purification of flue gases from incineration plants, in particular from fly ash, which contain heavy metals and which therefore cannot be disposed of directly in landfills.

2. Description of the Background

DE-B 33 20 466 (U.S. Pat. No. 4,617,180) discloses the extraction of flue dusts containing heavy metals with an acidic solution and then effecting precipitation of the heavy metals with a precipitating agent. The resulting precipitate having a high heavy metal content is fed to a metal recovery stage. The extracted residue, which still contains small amounts of heavy metals, is recycled to the incineration plant and incorporated in the slag of the plant under the action of heat. This method of disposal is expensive and may lead to an accumulation of heavy metals in the incineration plant.

EP-A 0 482 335 discloses that the heavy metals remaining in the extraction residue after the acidic extraction can be immobilized with an aqueous solution of a precipitating agent. If the pulverulent extraction residue rendered inert in this manner is conveyed to a landfill, it may be transported, in the dry state, by the wind and by the water when it rains. Here too, the heavy metals are precipitated from the extract.

In both known processes, it is necessary to find an outlet for the precipitate having a high heavy metal content. If, for economic or technical reasons, recovery is impossible, this precipitate must be disposed of in an environmentally compatible manner, in accordance with particular local regulations. A need therefore continues to exist for an acceptable method of disposing of precipitated heavy metals obtained from fly ash.

SUMMARY OF THE INVENTION

Accordingly, one object of the present invention is to provide a process which permits both the extracted residue and the precipitate containing heavy metals to be disposed of independently of one another or together in an environmentally compatible manner.

Briefly, this object and other objects of the present invention as hereinafter will become more readily apparent, can be attained by a process for the disposal of solid residues obtained from flue gas purification by acid extracting heavy metals from the solid residues, thereby forming a solid extracted material and an acid phase containing heavy metals, precipitating the heavy metals from the acid phase with subsequent mechanical separation of the precipitate containing heavy metals from the mother liquor, subjecting the separated precipitate to mechanical stress, the water contained in the precipitate being released, resuspending the precipitate containing the heavy metals in the separated water, adding a hydraulic binder to the resuspended precipitate containing heavy metals and/or to the extracted residues separately from one another, preparing molded objects with the binder-containing mixture, the moldings being then allowed to harden, and forming walls which define a space within a landfill with the hardened moldings.

In another aspect of the invention, after the binder containing mixture is obtained, it is applied as layers in a landfill which harden in place.

DESCRIPTION OF THE DRAWING

A more complete appreciation of the invention and many of the attendant advantages thereof will be readily obtained as the same becomes better understood by reference to the following detailed description when considered in connection with the accompanying drawings, wherein:

the drawing is a flow diagram of the process steps of the present invention.

DETAILED DESCRIPTION OF THE PREFERRED EMBODIMENTS

In the present invention, environmentally compatible disposal of both the extracted residues and the precipitate containing heavy metals is achieved. On the one hand, a disposal aid, namely the moldings for defining landfill spaces, is formed from a part of the material to be disposed of; on the other hand, the spaces defined by these moldings form stable, inert containers for the remaining material to be disposed of and protect the latter from external influences, in particular removal and transport by wind and water and leaching by water. Depending on requirements, any amounts of the resulting residues can be processed to moldings, i.e. building blocks. Advantageously, the moldings are formed from the precipitate containing heavy metals and the plastic mixture to be introduced into the preformed spaces is formed from the extracted residue. If the precipitate containing heavy metals is fed to the metal recovery stage, the moldings, too, may be formed from the extracted residue.

If the precipitate containing heavy metals is also to be disposed of in a landfill, it is subjected to mechanical stress after separation from the mother liquor, preferably by means of a filter press. Here, the water contained in the filter cake is released, and the precipitate is resuspended to form a pasty, slurry-like mass. The water released simultaneously serves for the setting of the added hydraulic binder. An amount of binder corresponding to the amount of water released is preferably added. On the basis of preliminary experiments, the amount of water released can be controlled and optimized via the amount of energy supplied in the application of the mechanical stress, for example the power consumption. The mechanical stress is preferably applied by means of shear forces, for example by means of a positive mixer. The amount of water which is released by means of mechanical stress and which can be monitored permits exact metering of the added binder and, after setting with the hydraulic binder, gives moldings having high stability. It is presumed that the high stability, in particular to leaching by water, is based on the optimum pore size achieved by this process. In general, a cement, preferably Portland cement, is used as the binder for the precipitate containing heavy metals.

The type and amount of the binder added to the extracted residue depends on the one hand on the composition of the latter, since it may also have binder properties, and on the other hand, on whether disposal is effected in the form of moldings or of liquid material.

Having generally described this invention, a further understanding can be obtained by reference to certain specific examples which are provided herein for purposes of illustration only and are not intended to be limiting unless otherwise specified.

In the embodiment of the invention shown in the flow diagram, flue dust 10 and acidic wash liquid 12 from a flue gas scrubber are combined in a stirred vessel 14. Here, the heavy metals are removed by dissolution or extraction from the flue dust suspended in the acidic wash liquid. The suspension passes from the stirred vessel 14 onto a vacuum belt filter 16, on which the extracted residue is separated from the extract containing heavy metals. The extract is transported to a vessel for metal precipitation 18, which is effected by means of known precipitating agents. The heavy metal precipitate which separates by precipitation is separated from the mother liquor in a filter press 20. The mother liquor is disposed of as wastewater 22. The filter cake from the filter press is fed to a positive mixer 24 in which, on the one hand, bound water is released, the filter cake being converted into a slurry-like form, and into which, on the other hand, the hydraulic binder 26 is metered thereinto. The binder-containing material is fed to a mold means 28 and shaped into blocks which are used in a landfill 30 to form walls which preferably define a U-shaped space.

The extraction residue remaining behind on the vacuum belt filter is fed to a mixer 32 and a suitable binder 26 is added to it. Prior to setting, the still plastic material is introduced in the form of layers into the spaces formed by the blocks in the landfill 30 and is preferably compacted and allowed to harden.

Example

In the incineration of 1 ton of waste,
250 kg of slag,
25 kg of fly ash (from the boiler and electrostatic and fabric filters) and
112 kg of acidic wash water (containing 4.5 kg of HCl (100%) and 3 kg of $Na_2SO_4$)
are obtained.

The fly ash is extracted with the acidic wash water for about 30 minutes in a cascade of stirred vessels. The heavy metals, which are soluble at a pH of 3 to 4, are dissolved out of the fly ash. The extracted fly ash, i.e., the extracted residue, is separated from the wash water containing heavy metals, i.e. from the extract, on a vacuum belt filter and washed with water. A small amount of precipitating agent for heavy metals may be added to the water in order to immobilize remaining traces of heavy metals. The moist extraction residue is mixed with 50 kg of CaO per ton of extraction residue. The damp binder-containing mixture is introduced in the form of layers into prepared spaces in a landfill and compacted by means of rollers and rams. Complete hardening and solidification of the residue takes place in about 20 days, depending on the composition.

The pH of the acidic filtrate from the vacuum belt filter, i.e. of the extract, is adjusted to 9 to 10 with Ca(OH)$_2$ in a wastewater treatment plant and treated with a flocculent and precipitating agent. The precipitate obtained is dewatered in a filter press and intensively processed in a so-called plough-share mixer. Suitable plough-share mixers are sold by the company Lodige, D-4790 Paderborn. In the plough-share mixer, the water bound in the filter cake is released, and the filter cake is converted into a slurry-like pasty form. This process is monitored by observing the power consumption of the drive motor of the plough-share mixer. When the power consumption has reached a minimum value, the process is complete. At this point in time, 500 to 1,000 kg of Portland cement are added, as hydraulic binder, per ton of filter cake. Other hydraulic binders based on calcium silicates or calcium aluminates are also suitable. After thorough mixing of the binder-containing material, it is introduced into steel molds having an edge length of 1 m and is compacted on a vibrating table. Compaction may also be effected by means of one or more known vibration needles. After three days, the blocks which are sufficiently stable for transportation are removed from the molds. The blocks are used in a landfill for forming boundary walls for spaces for receiving the extraction residue to which a hydraulic binder has been added.

The material disposed of according to the invention, i.e. both the extraction residue and the precipitate containing heavy metals, is stable to environmental influences and conforms to the provisions of the Swiss Regulation on Wastes, of 01.02.1991.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A process for disposal of solid residues obtained from flue gas purification, comprising:
   acid extracting heavy metals from the solid residues, thereby forming a solid extracted material of extracted solid residues and an acid phase containing heavy metals;
   precipitating the heavy metals from the acid phase with subsequent mechanical separation of the precipitate containing the heavy metals from a mother liquor;
   subjecting the separated precipitate to shear forces, whereby water contained in the precipitate is released, and resuspending the precipitate containing the heavy metals in the released water;
   adding a hydraulic binder to the resuspended precipitate containing the heavy metals or to the extracted solid residues or to the resuspended precipitate containing the heavy metals and to the extracted solid residues while keeping the resuspended precipitate and the extracted solid residues separate from each other to obtain at least one binder-containing mixture;
   preparing molded objects with the binder-containing mixture, the molded objects being then allowed to harden; and
   forming walls which define a space within a landfill with the hardened molded objects.

2. A process for disposal of solid residues obtained from flue gas purification, comprising:
   acid extracting heavy metals from the solid residues, thereby forming a solid extracted material of extracted solid residues and an acid phase containing heavy metals;
   precipitating the heavy metals from the acid phase with subsequent mechanical separation of the precipitate containing the heavy metals from a mother liquor;
   subjecting the separated precipitate to shear forces, whereby water contained in the precipitate is released;
   resuspending the precipitate containing the heavy metals in the released water;

adding a hydraulic binder to the resuspended precipitate containing heavy metals or to the extracted solid residues or to the resuspended precipitate containing the heavy metals and to the extracted solid residues while keeping the resuspended precipitate and the extracted solid residues separate from each other to obtain at least one plastic binder containing mixture; and introducing the plastic binder containing mixture as applied layers into preformed landfill spaces and allowing the layers to harden.

3. The process according to claim 1, wherein Portland cement is the hydraulic binder.

4. The process according to claim 2, wherein calcium oxide is the hydraulic binder.

5. The process according to claim 1, wherein the hydraulic binder is added to the extracted solid residues to form the binder-containing mixture, and then moldings are formed, which moldings are allowed to harden, after which hardening walls for defining landfill spaces are formed with the hardened moldings in a landfill.

6. The process according to claim 1 or 2, wherein a precipitating agent for the heavy metals is added to the extracted solid residues.

7. The process according to claim 1 or 2, wherein the precipitate containing the heavy metals is separated from the mother liquor using a filter press.

8. The process according to claim 1 or 2, wherein the precipitate containing the heavy metals and separated from the mother liquor is subjected to shear forces in a positive mixer.

9. The process according to claim 8, wherein the shear forces are maintained until the power consumption of a mixer motor of the positive mixer has reached a minimum value.

10. The process according to claim 1 or 2, wherein an amount of the hydraulic binder which sets with the released water is added to the resuspended precipitate containing the heavy metals.

* * * * *